E. P. ALTENBURG.
PNEUMATIC TIRE.
APPLICATION FILED NOV. 28, 1919.
1,337,813.
Patented Apr. 20, 1920.
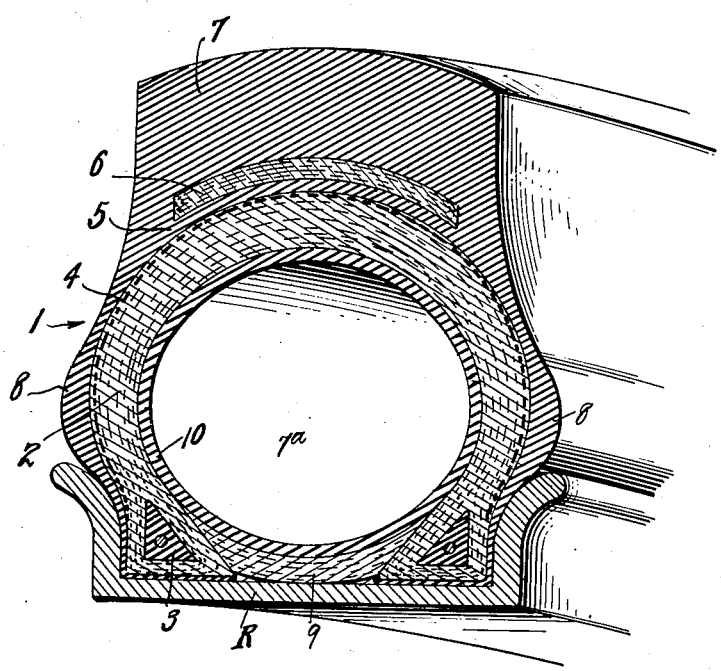
Witnesses
Ernest C. Crocker
S. M. McColl
Inventor
Eric P. Altenburg
By Richard B. Owen,
Attorney

UNITED STATES PATENT OFFICE.

ERIC P. ALTENBURG, OF COLUMBIANA, OHIO.

PNEUMATIC TIRE.

1,337,813.   Specification of Letters Patent.   Patented Apr. 20, 1920.

Application filed November 28, 1919. Serial No. 340,972.

*To all whom it may concern:*

Be it known that I, ERIC P. ALTENBURG, a citizen of the United States, residing at Columbiana, in the county of Columbiana and State of Ohio, have invented certain new and useful Improvements in Pneumatic Tires, of which the following is a specification.

This invention relates to vehicle tires and more particularly to pneumatic tires.

The object of the invention is to so construct such a tire that it will combine all of the advantages of a pneumatic tire with those of a solid tire, eliminating the disadvantages of both.

Another object is to construct such a tire without employing any metallic substance and in which the air space is much smaller than that of the ordinary tire and yet provide a tread which will at all times ride on this air space.

Another object is to so construct such a tire that it may be applied to any standard rim and which will greatly economize in the use of gasolene.

Another object is to so shape a tire of this character that the weight of the vehicle will be borne by thickened walls when overloaded and said walls will rest after a certain pressure on the side walls of the rim, and in which neither the tread nor the side walls at any time ever project laterally into a plane beyond that occupied by the side walls of the rim, thereby avoiding danger of the side walls of the tire contacting with curbs or other obstacles.

Another object is to so form a tire of this character that the tread thereof at all times lies within the plane occupied by the air space so that riding on air at all times will be the result.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

The accompanying drawing represents a perspective view of a portion of a tire constructed in accordance with this invention, said tire being shown in section.

In the embodiment illustrated the tire 1 constituting this invention is shown mounted on a rim R of ordinary construction.

This tire 1 constitutes a casing made up of a member 2 formed from a plurality of plies of fabric. This member extends around the bead 3 and is designed to hold the tube 10 within bounds as is ordinary in tires of this character. The air space $1^a$ of this tire, in which the tube 10 is located, is considerably smaller than in the ordinary pneumatic tire and yet is sufficiently large to provide for the riding thereon at all times of the tread presently to be described. A ply 4 of open weave fabric covers the entire member 2 and is located between said member and the cushion stock 5, being designed to knit the stock 5 to the casing member 2 to avoid all separation thereof. The cushion stock 5 covers the entire member 2 to the point of the bead 3. An open weave fabric strip 6 known as the breaker strip is positioned opposite the tread portion 7 of the tire in the cushion stock and is designed to distribute any heavy jar the tire may receive. The tread 7 which is made of solid tough resilient rubber is so shaped and mounted that it will at all times ride on air, the width of said tread corresponding to the width of the air space $1^a$, the side walls of said tread being substantially rectilinear and lying in the same vertical or radial plane as the side walls of the inner tube 10. The side walls of the casing 1 have reinforcing annular ribs 8 formed at points spaced from the inner edges of said side walls and are designed to rest when a certain pressure is brought to bear on the edges of the rim R.

A straight line drawn down through the tire from the outer face of the side walls of tread 7 shows that these walls do not extend beyond the air space $1^a$ and for this reason this tire will ride as easily and be as lively as any pneumatic tire now known. A fabric flap or floating ring 9 is arranged between the beads of the casing and between the rim R and the inner tube 10 to protect the tube from the rim, this being an old feature found in ordinary pneumatic tires.

A tread of the ordinary pneumatic tire which rests on the ground is flattened into a straight line having a tendency to cause lagging of the car at all times, the same as though there were a flat place in the wheel. This alone does not cause lagging of the car but after running it at a certain speed it will be found that there is a bulge just forward of the flattened portion and as the air travels in the opposite direction to the wheel this causes the car to jump from time to time. The construction of the tire constituting this invention is designed to eliminate this to such an extent as to be unnoticeable.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention what I claim as new and desire to secure by Letters Patent, is:

1. A tire composed of a casing having an air space and provided with a thickened tread, the side walls of which lie in the same plane as the side walls of the air space, the side walls of the casing having thickened portions spaced from its inner edges and designed to rest on the side walls of the rim.

2. A tire composed of a casing shaped to fit an ordinary wheel rim, and having a central air space with an inner tube fitted therein, a thickened tread of a width substantially equal to the diameter of the air space, and side walls of said casing having thickened rib-like portions on their outer faces arranged substantially midway the width of said walls.

In testimony whereof I affix my signature in presence of two witnesses.

ERIC P. ALTENBURG.

Witnesses:
   S. E. TIDD,
   E. EVERETT HANDTE.